(12) United States Patent
Solomon et al.

(10) Patent No.: US 7,670,012 B2
(45) Date of Patent: Mar. 2, 2010

(54) PROJECTION SYSTEM AND METHODS

(75) Inventors: Mark C. Solomon, Cupertino, CA (US); Brittany Davis, Houston, TX (US); Glen Allen Oross, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 11/515,698

(22) Filed: Sep. 5, 2006

(65) Prior Publication Data

US 2008/0055565 A1 Mar. 6, 2008

(51) Int. Cl.
G03B 21/14 (2006.01)
G03B 21/22 (2006.01)

(52) U.S. Cl. ........................ 353/119; 348/794
(58) Field of Classification Search .................. 353/39, 353/34, 43, 67, 72, 119; 348/794
See application file for complete search history.

(56) References Cited

U.S. PATENT DOCUMENTS

| 3,285,126 A | 11/1966 | Lucas |
| 3,532,419 A | 10/1970 | Tanaka |
| 3,614,040 A | 10/1971 | Martinez |
| D317,616 S | 6/1991 | Shiiba |
| 5,642,927 A | 7/1997 | Booth et al. |
| 5,663,762 A | 9/1997 | Nishiyama |
| 5,740,480 A * | 4/1998 | Kuhn et al. .................. 396/177 |
| 6,604,831 B1 | 8/2003 | Prestigomo et al. |
| 6,712,475 B2 | 3/2004 | Davis et al. |
| D489,390 S | 5/2004 | Ohshima et al. |
| 7,280,857 B2 * | 10/2007 | Geernaert ................ 455/575.4 |
| 2005/0140941 A1 | 6/2005 | Maddock |
| 2005/0237499 A1 | 10/2005 | Oross et al. |

* cited by examiner

Primary Examiner—Georgia Y Epps
Assistant Examiner—Sultan Chowdhury

(57) ABSTRACT

A projection system has a housing and a projector removably, pivotally attached to the housing. The projector can pivot relative to the housing between a first position, where a light outlet of the projector is covered by the housing, and a second position, where the light outlet of the projector is exposed.

20 Claims, 7 Drawing Sheets

PROJECTION SYSTEM AND METHODS

BACKGROUND

Typically, adjusting a vertical distance of at least a portion of projector above a surface, such as a tabletop, that supports the projector adjusts a vertical location of an image projected onto a screen by the projector. For example, pivoting a portion of a projector can adjust the vertical location of a projected image. For some applications, a post that extends from the projector maintains the projector at a desired pivot angle and thus maintains the desired vertical location of the projected image. When the projector is not in use, the post can be retracted into the projector.

A locking mechanism typically prevents the post from retracting into the projector, due to the weight of the projector, when the projector is in use. For some projectors, the post is biased, e.g., spring loaded, so that it extends from the projector in response to a biasing force, e.g., a spring force, and the locking mechanism prevents the post from extending when the projector is not in use. However, the use of a post, a post and a locking mechanism, or a post, a locking mechanism, and a spring increases the size and weight of the projector, which is undesirable, especially for applications involving mobile projectors or mobile miniature projectors.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
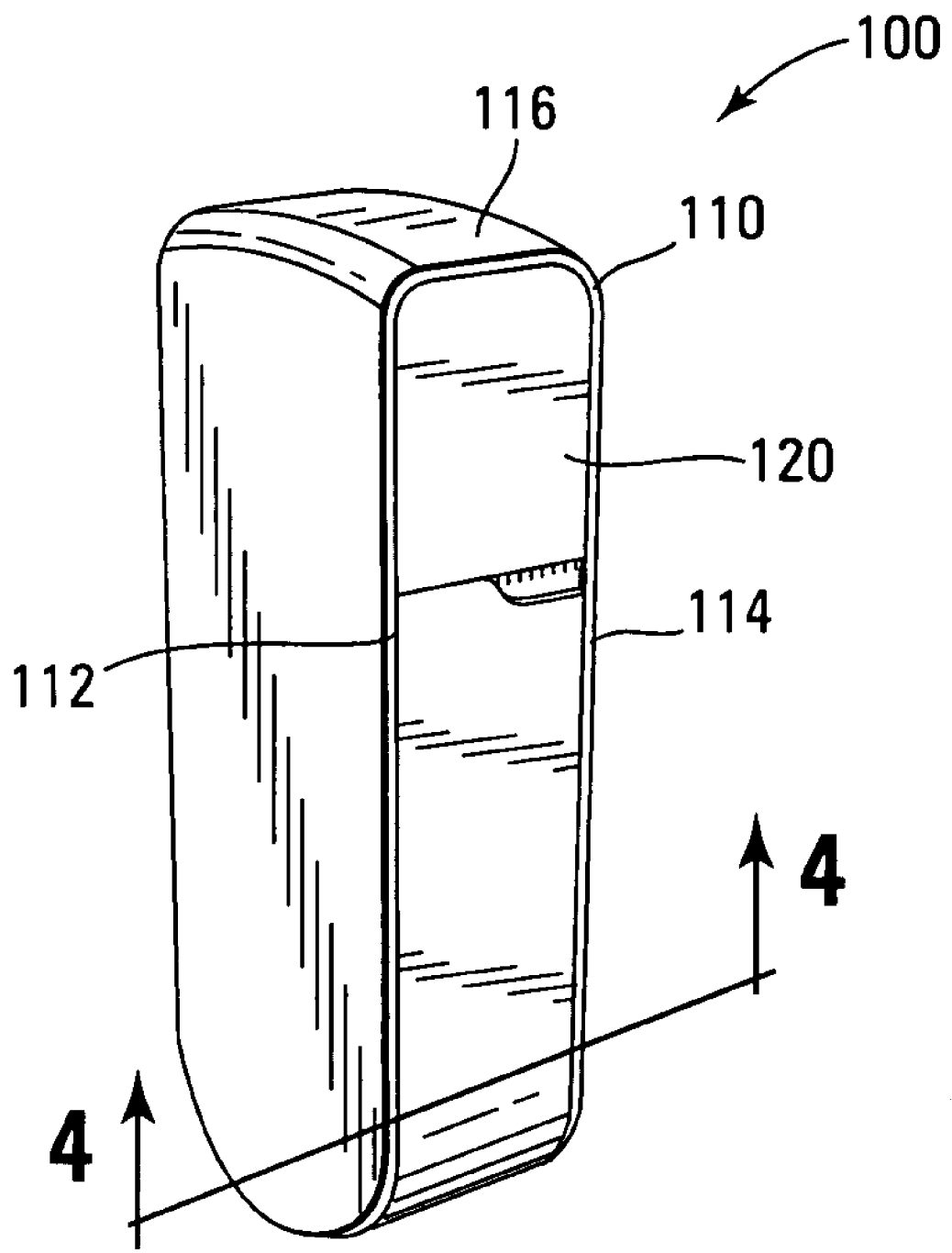
FIG. 1 is a perspective view of an embodiment of a projection system configured for nonuse, according to an embodiment of the invention.
Figure 3:
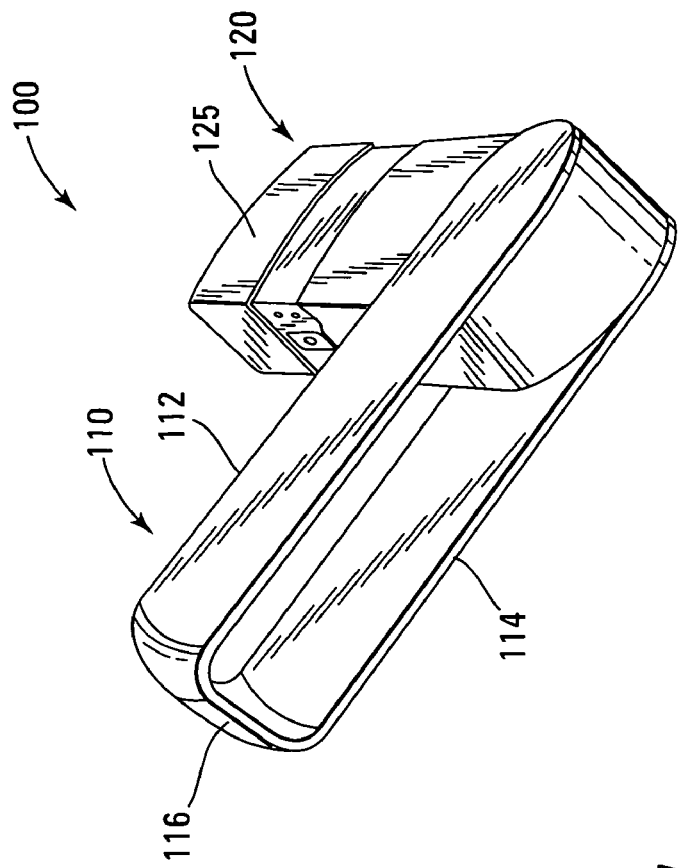
FIG. 3 is a bottom perspective view of an embodiment of a projection system configured for use, according to another embodiment of the invention.
Figure 2:
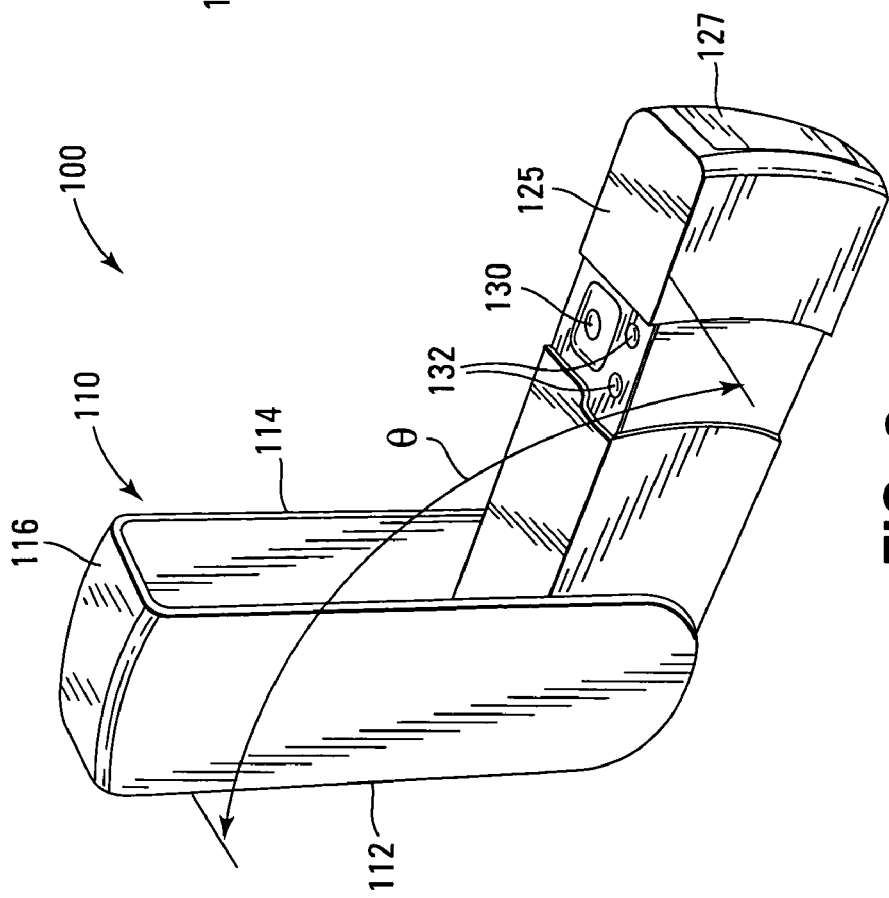
FIG. 2 is a front perspective view of an embodiment of a projection system configured for use, according to another embodiment of the invention.

FIG. 1 is a perspective view of a projection system 100, according to an embodiment. FIG. 1 illustrates projection system 100 configured for nonuse, e.g., for storage or transport, where projection system 100 is not projecting images. FIGS. 2 and 3 are respectively a front perspective view and a bottom perspective view of projection system 100 configured for use, e.g., for projecting images, according to another embodiment. As shown in FIGS. 1-3, projection system 100 includes a housing 110 and a projector 120. To use projector 120, projector 120 is pivoted from housing 110 to a pivot angle θ between housing 110 and projector 120, as shown in FIG. 2. For one embodiment, projector 120 can be pivoted 360 degrees. For another embodiment, projector 120 can be pivoted in either a clockwise or a counterclockwise direction.

For one embodiment, housing 110 has opposing sidewalls 112 and 114 with an end-wall 116 connected therebetween, as shown in FIGS. 1-3. For another embodiment, sidewalls 112 and 114 and end-wall 116 are integral. Projector 120 is pivotally attached to housing 110 at an end opposite end-wall 116, as shown in FIGS. 2 and 3. When projection system is configures for nonuse (FIG. 1), for one embodiment, projector 120 is contained within housing 110, and housing 110 partially covers projector 120, with sidewalls 112 and 114 and end-wall 116 covering corresponding portions of projector 120 and the remaining portions of projector 120 being exposed.

For one embodiment, projector 120 has a telescopic cover 125 (FIGS. 2 and 3). A light outlet 127, such as a lens, a transparent lens cover, etc., is located at an end of cover 125, as shown in FIG. 2. When projector 120 is contained in housing 110, end-wall 116 of housing 110 covers light outlet 127, as shown in FIG. 1. Moreover, for another embodiment, cover 125 is retracted when projector 120 is contained in housing 110, as shown in FIG. 1. When projector 120 is pivoted from housing 110, cover 125 can be extended so that a length of projector 120 is longer than sidewalls 112 and 114 of housing 110, as shown in FIGS. 2 and 3. For one embodiment, when cover 125 is retracted, optics, such as lenses, mirrors, etc., within projector 120 are in a nonuse position to facilitate the compactness of projector 120. When cover 125 is extended, the optics are positioned for use for directing light through light outlet 127 and thus for projecting an image through light outlet 127. For one embodiment, projector 120 includes one or more light emitting diodes (LEDs) that constitute a light source of projector 120. For another embodiment, projector 120 is a miniature projector, e.g., that can fit in a purse or a pocket of a garment.

For another embodiment, when cover 125 is extended, a media slot 130 and projector controls 132 are exposed, as shown in FIG. 2. For one embodiment, media slot 130 is configured to receive digital source data, for example, from an image source, such as a computer, DVD player, a set-top box connected to a direct television satellite link, cable television provider, etc. Note that when cover 125 is retracted, cover 125 covers media slot 130 and projector controls 132.

Figure 4:
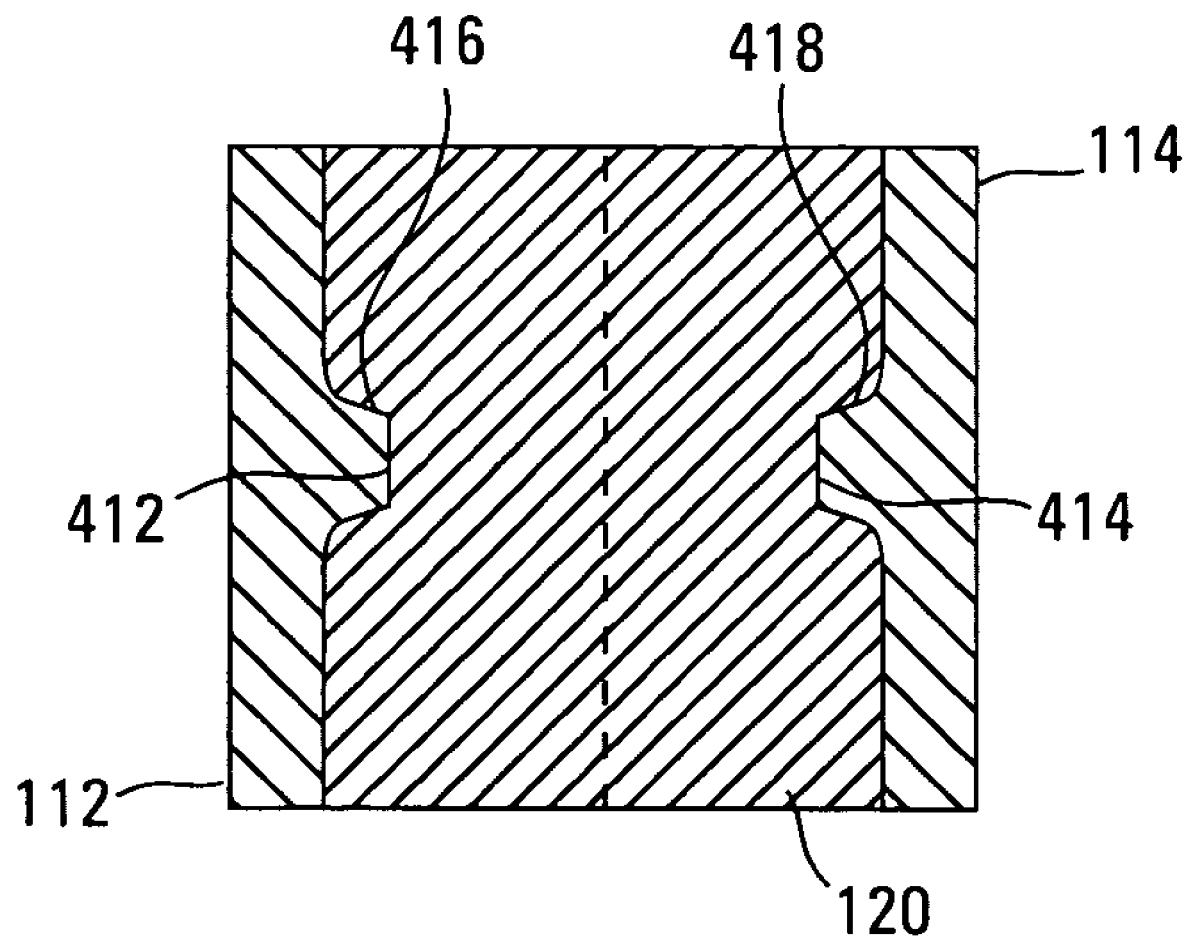
FIG. 4 is a view taken along line 4-4 of FIG. 1, according to another embodiment of the invention.

FIG. 4 is a view taken along line 4-4 of FIG. 1, according to another embodiment. For one embodiment, projector 120 is pivotally attached to housing 110 by protuberances 412 and 414 (FIG. 4), respectively extending from inner surfaces of opposing sidewalls 112 and 114, that respectively extend into recesses 416 and 418 in projector 120 so that recesses 416 and 418 can respectively rotate about protuberances 412 and 414. Alternatively, for another embodiment, protuberances may extend from the outer surfaces of projector 120 into recesses in opposing sidewalls 112 and 114 of housing 110 (not shown) so that the protuberances rotate within the recesses.

For one embodiment, housing 110 is of a material, such as plastic or metal, that is sufficiently resilient so that sidewalls 112 and 114 bias protuberances 412 and 414 into recesses 416 and 418. This removably attaches housing 110 to projector 120 in that sidewalls 112 and 114 can be moved apart, against their respective biasing forces, to facilitate removal of protuberances 412 and 414 from recesses 416 and 418, enabling projector 120 to be removed from housing 110. Sidewalls 112 and 114 are further biased into frictional contact with their corresponding outer surfaces of projector 120, at least in the region surrounding recesses 416 and 418, as shown in FIG. 4. The friction between sidewalls 112 and 114 and their corresponding outer surfaces of projector 120 acts to prevent projector 120 from pivoting relative to housing 110 under the influence of gravity and thus acts to maintain the pivot angle θ (FIG. 2).

Figure 6:
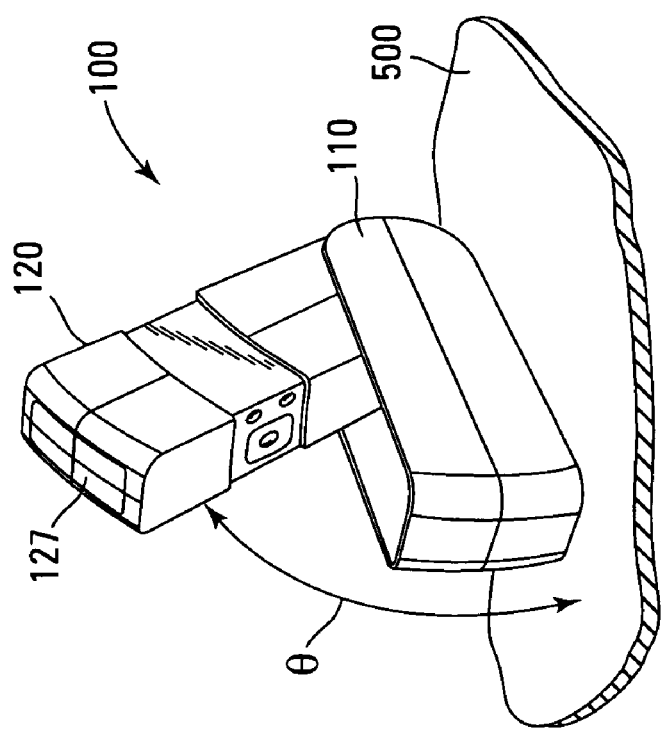
FIG. 6 is a perspective view of an embodiment of a projection system positioned on a surface and configured for use, according to another embodiment of the invention.
Figure 5:
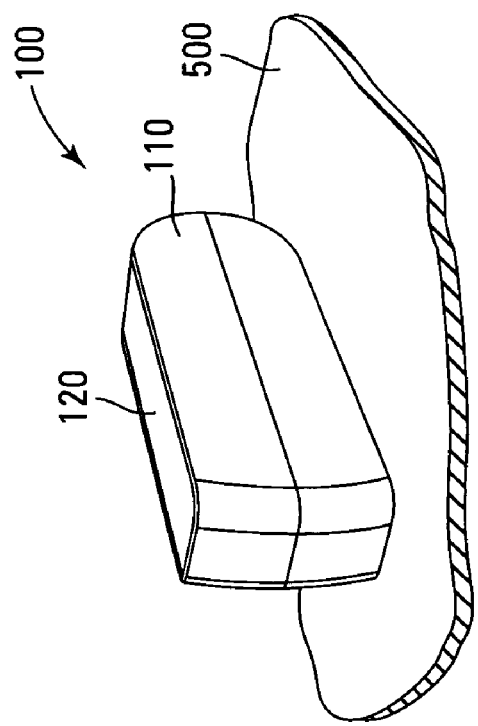
FIG. 5 is a perspective view of an embodiment of a projection system positioned on a surface and configured for nonuse, according to another embodiment of the invention.

FIG. 5 is a perspective view of projection system 100 on an upward facing surface 500, such as a tabletop or the like, with projector 120 contained within housing 110, according to another embodiment. FIG. 6 is a perspective view of projection system 100 on surface 500 configured for use, i.e., projector 120 is pivoted from housing 110 to a pivot angle θ, according to another embodiment. Note that for one embodiment, friction between housing 110 and projector 120 maintains the pivot angle θ, as described above in conjunction with FIG. 4. Note further that adjusting the pivot angle θ adjusts the height of light outlet 127 above surface 500 and thus adjusts the vertical position of an image projected through light outlet 127 onto a screen, for example.

Figure 7:
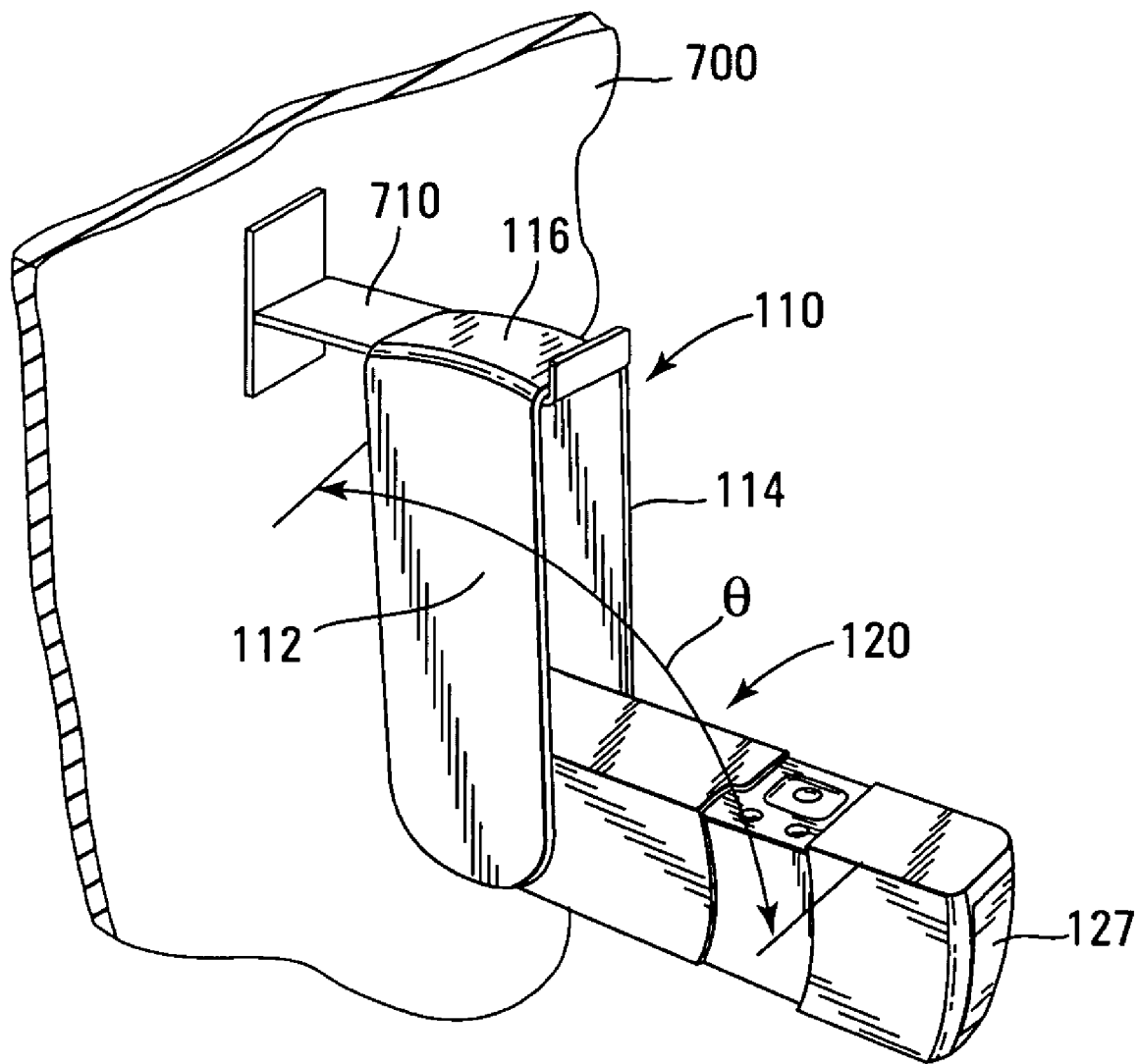
FIG. 7 is a perspective view of an embodiment of a projection system configured for use and suspended from a hook connected to a vertical surface, according to another embodiment of the invention.

FIG. 7 is a perspective view of projection system 100 configured for use and suspended from a hook 710 attached to vertical surface 700, such as a wall or the like, according to another embodiment. Specifically, hook 710 passes between sidewalls 112 and 114, and end-wall 116 bears against hook 710 so as to transmit the weight of projection system 100 to hook 710.

Figure 8:
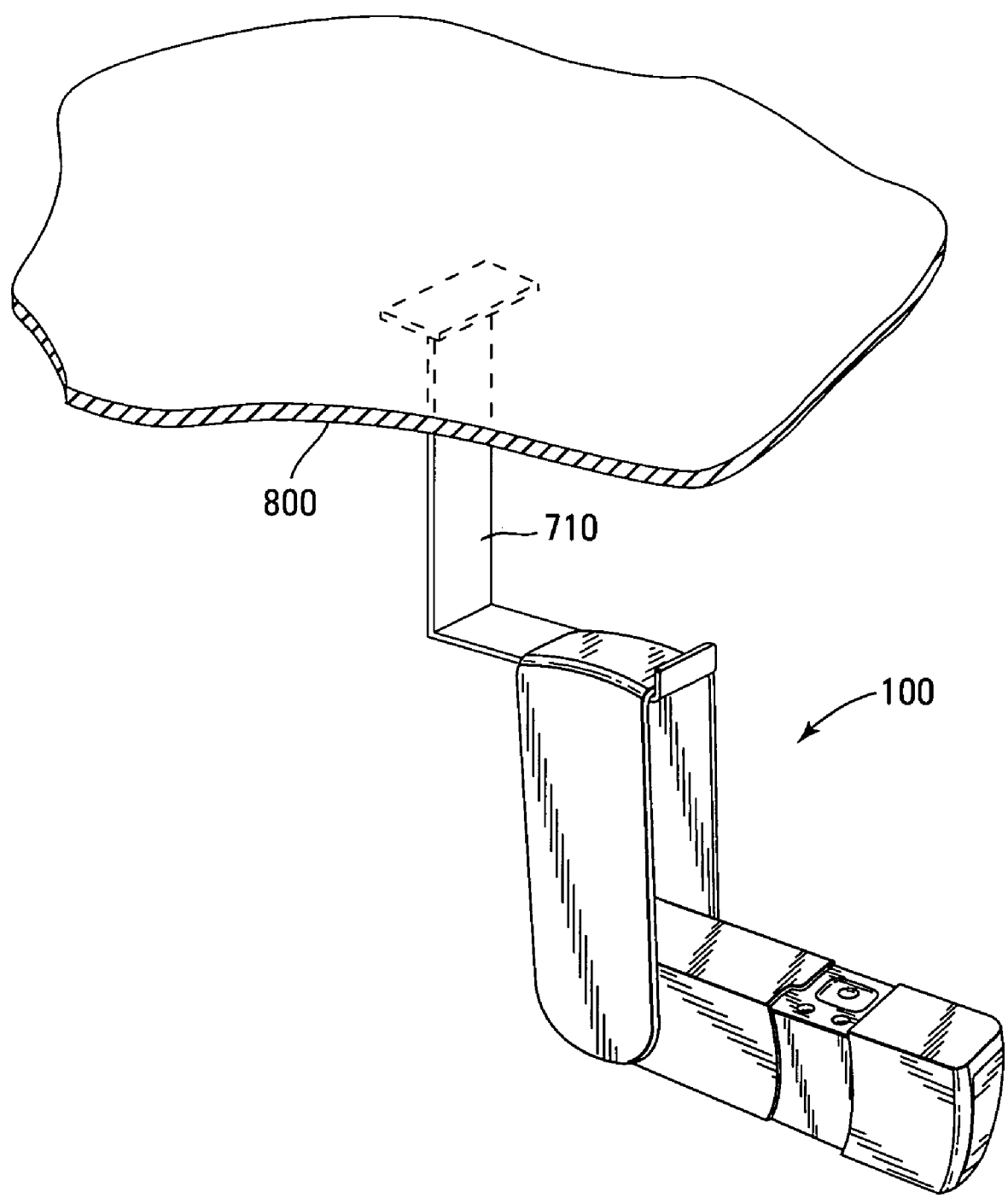
FIG. 8 is a perspective view of an embodiment of a projection system configured for use and suspended from a hook connected to downward facing surface, according to another embodiment of the invention.
Figure 9:
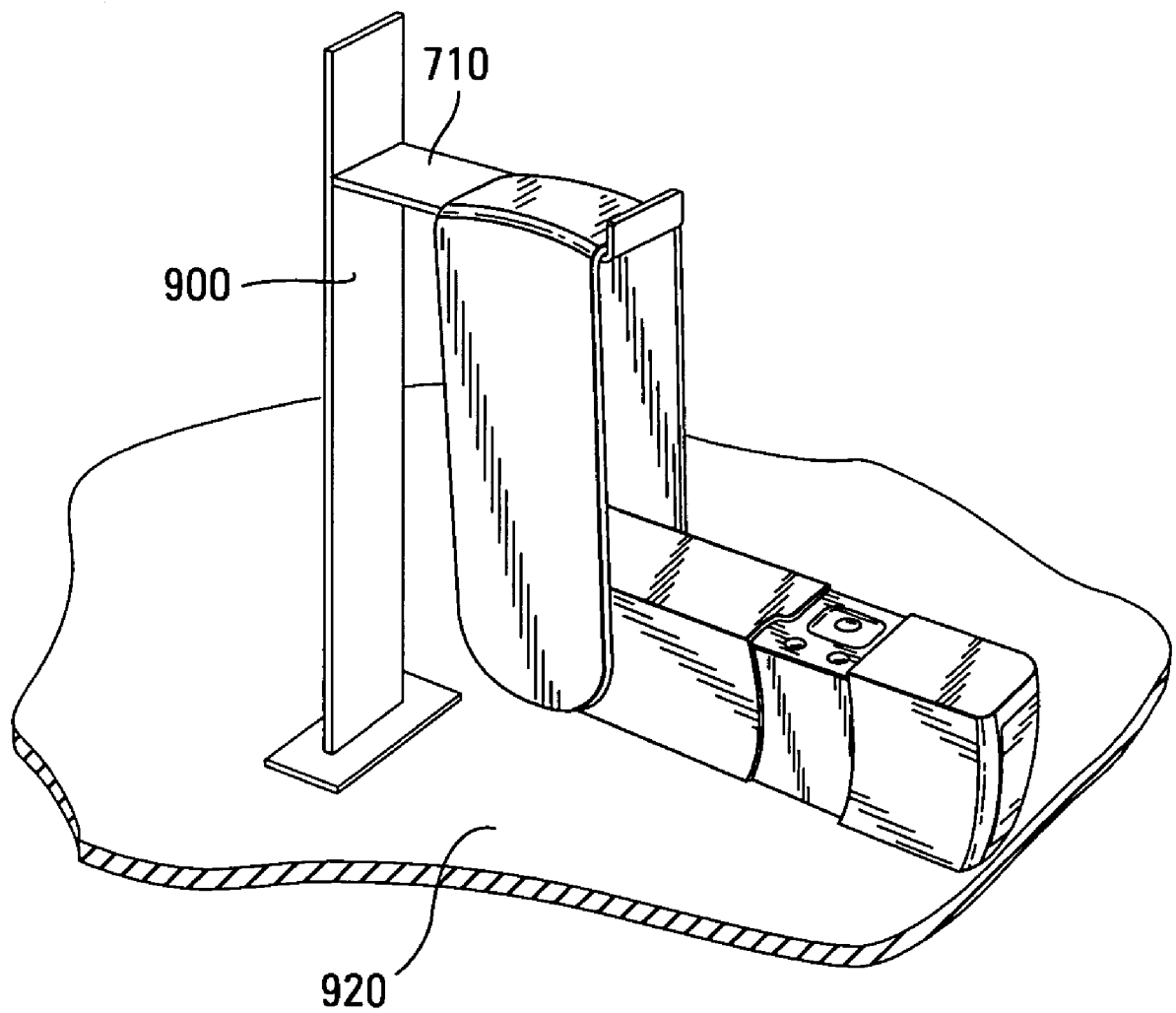
FIG. 9 is a perspective view of an embodiment of a projection system configured for use and suspended from a hook connected to a post extending from an upward facing surface, according to another embodiment of the invention.

In an alternative embodiment, as shown in FIG. 8, hook 710 may be attached to a downward facing surface 800, such as a ceiling or the like, for suspending projection system 100 from surface 800. For another embodiment, as shown in FIG. 9, hook 710 may be attached to a post 900 extending upward from an upward facing surface 920, such as a tabletop or the like, for suspending projection system 100 from vertical post 900.

Note that projector 120 is pivoted from housing 110 before suspending projection system 100 from hook 710. For one embodiment, pivot angle θ may be subsequently adjusted to adjust the position of an image projected through light outlet 127.

CONCLUSION

Although specific embodiments have been illustrated and described herein it is manifestly intended that the scope of the claimed subject matter be limited only by the following claims and equivalents thereof.

What is claimed is:

1. A projection system, comprising:
   a housing having opposing sidewalls and an end-wall interposed between the opposing sidewalls and connected to each of the opposing sidewalls; and
   a projector removably, pivotally attached to each of the opposing sidewalls of the housing;
   wherein the projector can pivot relative to the housing between a first position, where a light outlet of the projector is covered by and faces toward the end-wall of the housing, and a second position, where the light outlet of the projector is exposed; and
   wherein the end-wall is connected to the opposing sidewalls when the projector is in the first and second positions.

2. The projection system of claim 1, wherein the projector has a telescopic cover.

3. The projection system of claim 2, wherein the light outlet of the projector is located at an end of the telescopic cover.

4. The projection system of claim 2, wherein the telescopic cover can be extended when the light outlet of the projector is exposed.

5. The projection system of claim 2, wherein the telescopic cover is retracted when the light outlet of the projector is covered by and faces toward the end-wall of the housing.

6. The projection system of claim 1, wherein the projector is contained within the housing when the projector is at the first position.

7. The projection system of claim 1, wherein at least a portion of the projector is exposed when the projector is at the first position.

8. The projection system of claim 1, wherein the projector can be pivoted in either a clockwise or counterclockwise direction.

9. The projection system of claim 1, wherein the projector can be pivoted by 360 degrees.

10. The projection system of claim 1, wherein the sidewalls of the housing are resilient and act to bias interior surfaces of the respective sidewalls into frictional engagement with corresponding outer surfaces of the projector wherein the frictional engagement acts to maintain a position of the projector relative to the housing.

11. A projection system, comprising:
    a housing having opposing first and second sidewalls and an end-wall interposed between the opposing first and second sidewalls and connected to an end of each of the opposing first and second sidewalls; and
    a projector having opposing first and second sides respectively pivotally attached to the opposing first and second sidewalls of the housing;
    wherein the projector can pivot relative to the housing between a first position, where a light outlet of the projector is covered by and faces toward the end-wall of the housing, and a second position, where the light outlet of the projector is exposed;
    wherein the light outlet is located at an end of a telescopic cover of the projector;
    wherein the telescopic cover is retracted when the projector is at the first position;
    wherein the telescopic cover can be extended when the projector is at the second position;
    wherein the end-wall is connected to the end of each of the opposing first and second sidewalls when the projector is in the first and second positions; and
    wherein the first and second sidewalls of the housing are resilient and act to bias first and second interior surfaces of the respective first and second sidewalls into frictional engagement with outer surfaces of the first and second sides of the projector.

12. The projection system of claim 11, wherein the projector can be pivoted in either a clockwise or counterclockwise direction.

13. The projection system of claim 11, wherein the projector can be pivoted by 360 degrees.

14. A method of operating a projection system, comprising:
pivoting a projector from a housing to expose a light outlet of the projector that was previously covered by and facing toward an end-wall of the housing interposed between opposing sidewalls of the housing and connected to each of the opposing sidewalls of the housing; and
extending a telescopic cover of the projector after pivoting the projector;
wherein the end-wall remains connected to the opposing sidewalls while the projector is pivoted.

15. The method of claim 14 further comprises projecting an image through the exposed light outlet onto a surface.

16. The method of claim 14 further comprises suspending the projection system from a ceiling, a wall, or a post after pivoting a projector from the housing.

17. The method of claim 16 further comprises further pivoting the projector relative to the housing, after suspending the projection system, to adjust a position of an image projected through the exposed light outlet onto a surface.

18. The method of claim 14, wherein pivoting the projector from the housing further adjusts a position of an image projected through the exposed light outlet onto a surface.

19. The method of claim 14 further comprises pivoting the projector back into the housing to cover the light outlet.

20. The method of claim 19 further comprises retracting the telescopic cover before pivoting the projector back into the housing.

* * * * *